Nov. 24, 1959  T. J. BOARDMAN ET AL  2,913,989
SEALING DEVICES FOR PUMPS
Filed March 15, 1957
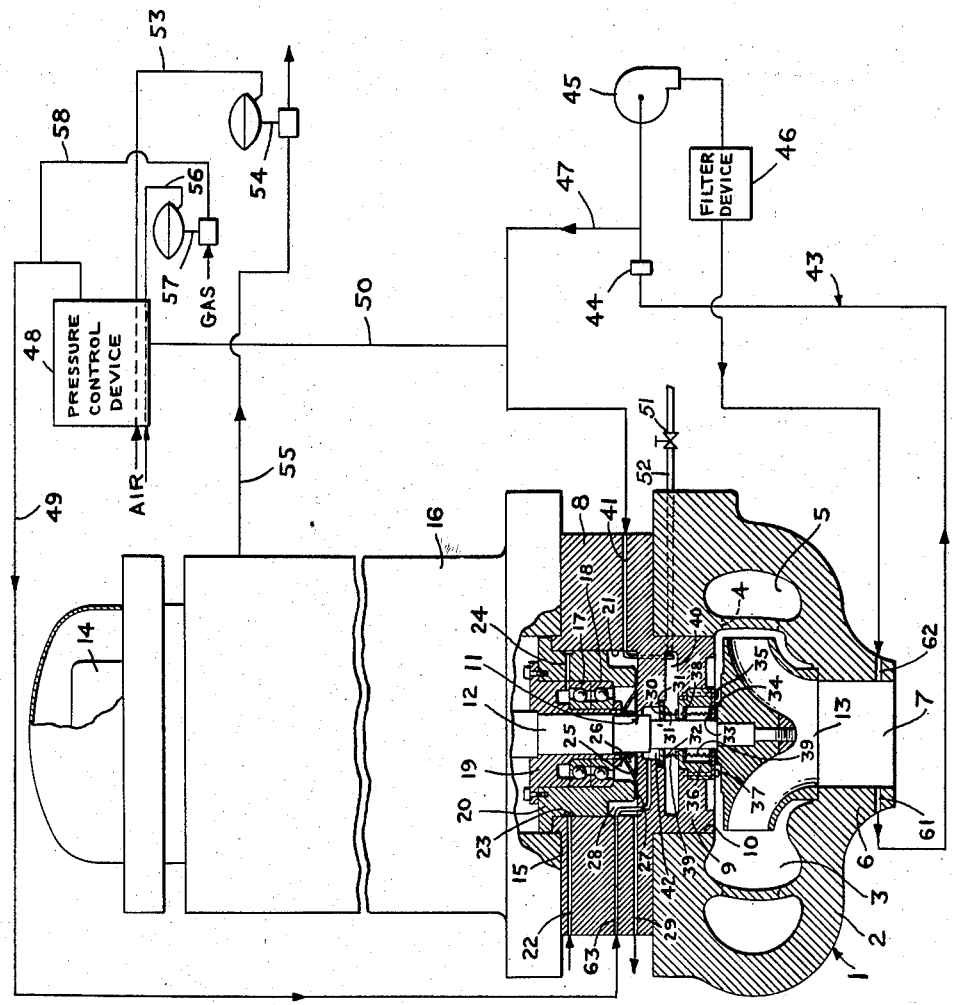
THADDEUS J. BOARDMAN
JOHN G. WILLIAMS
INVENTORS
BY Daniel H Bobis
Atty

United States Patent Office 2,913,989
Patented Nov. 24, 1959

2,913,989

SEALING DEVICES FOR PUMPS

Thaddeus J. Boardman, Jersey City, and John G. Williams, Springfield, N.J., assignors to Worthington Corporation, Harrison, N.J., a corporation of Delaware Application March 15, 1957, Serial No. 646,385

1 Claim. (Cl. 103—111)

This invention relates to sealing devices, and is particularly adapted for use on centrifugal type pumps.

More particularly, the sealing device is intended for pumps pumping liquids which must be kept pure, and in which accordingly the lubricant supplied to the pump bearings must be prevented from entering the pumping chamber and contaminating the liquid being pumped.

In the prior art, U.S. Patent No. 2,730,954, issued January 17, 1956, shows a sealing device to overcome this problem comprising, in general, a pair of mechanical seals disposed about the shaft in opposite ends of a sealing chamber formed in the shaft bore, and in which the inner sides thereof are subjected to pressure of sealing liquid at pump discharge pressure.

Leakage of this sealing liquid outwardly through the seals opposes the flow of lubricant leaking toward the pumping chamber at the upper seal, and liquid leaking up along the shaft from the pumping chamber toward the bearings at the lower seal. To obtain the above reaction at the upper seal, it is necessary that the pressure of the lubricant for this prior art sealing device be controlled by suitable pressure control means so that it never exceeds pump discharge pressure.

In the present invention, the sealing device comprises a pair of mechanical seals disposed about the shaft in opposite ends of a sealing chamber formed in the shaft bore, and the sealing liquid supplied to the sealing chamber, to which the inner sides of the seals are subjected, is liquid at pump inlet pressure, as distinguished from pump discharge pressure. Liquid from the pumping chamber acting against the outer side of the lower seal and being at the higher pressure of pump discharge, is thereby induced to leak through the lower seal into the sealing chamber, in the direction which opposes the flow of lubricant leaking toward the pumping chamber. To obtain this reaction, in the present invention, no pressure control means are needed since pump discharge pressure must always be greater than pump inlet pressure.

Accordingly, it is an object of the invention to utilize the inherent difference in pump inlet and discharge pressures, to prevent the leakage of lubricant into the pumping chamber.

Another object is to adapt the sealing device for use on a pump having a gas sealed driving prime mover, and to utilize a controlled difference maintained between the gas and sealing liquid pressures to induce leakage of sealing liquid through the upper seal in the direction which also opposes lubricant leaking toward the pumping chamber.

The invention will be better understood when considered in connection with the accompanying specification and the drawing forming a part thereof, in which is shown a longitudinal view, partly broken away, of a pump and a gas sealed driving prime mover, equipped with a sealing device constructed in accordance with the practice of the invention.

Referring to the drawing, a centrifugal type pump is generally designated 1, having a pump casing 2 which is recessed therein to form an impeller chamber 3. Communicating with the impeller chamber 3 through a connecting passageway 4 is an annular discharge chamber 5. In an extended portion 6 of the pump casing 2, an inlet passage 7 opens on the said impeller chamber 3, and liquid is delivered therethrough to the pump.

An intermediate casing 8 is connected to the pump casing 2, and has an extended portion 9 disposed in a bore 10 in the pump casing 2 which in turn is provided with an axial bore therethrough, generally designated 11, for the accommodation of a rotatable shaft 12. The shaft 12 extends into the impeller chamber 3 to receive impeller 13 thereon, and at the end remote from the impeller, is connected by suitable means to a motor 14 which drives the shaft and impeller.

Supported by the intermediate casing 8, and seated in an annular recess 15 provided in the intermediate casing 8, is a bell-shaped housing 16 which forms a gas-tight enclosure for the motor 14. In practice, the housing 16 is filled with an inert gas under pressure, such as nitrogen, so that in the event any lubricant from the pump bearings, which will be at a temperature above its flash point in air should by chance leak up along the shaft 12 into the housing 16, there will be no combustion reaction when it comes in contact with the inert gas.

The impeller end of the shaft 12 is supported by a pair of ball bearing type bearing units 17 and 18, which are held in supporting contact with the shaft 12 by containing elements 19 and 20 disposed in a bore 21 in the intermediate casing 8.

A suitable lubricant is supplied to the bearing units from a source (not shown) through a passageway 22 in the intermediate casing 8, in turn communicating with an annular groove 23 formed in containing element 20. From there the lubricant is delivered to the bearings through a plurality of passageways 24, only one of which is shown in the drawing. The lubricant passes by gravity through the bearings units onto a conically shaped draining plate 25 positioned in a chamber 26 located beneath the bearing units, so that the lubricant is diverted toward and through a passageway 27 formed between the containing element 20 and the intermediate casing 8, into an annular draining chamber 28. From the draining chamber 28, the lubricant is drained through a passageway 29 in the intermediate casing 8 and returned to its source.

In the event that lubricant should by chance by-pass the draining plate 25, an appropriate sealing device is provided about the shaft 12 to prevent the lubricant from leaking down along the said shaft into the impeller chamber 3.

This sealing device consists of a sealing chamber 40 formed in the bore 11 of the extended portion 9 of the intermediate casing 8, and sealing means which could consist of ordinary packing or as shown the two sealing rings 30 and 33 each disposed about the shaft 12 in opposite ends of the said sealing chamber. The sealing ring 30, or the sealing ring in the upper end of the sealing chamber 40, has a sliding fit on the shaft 12 and an annular sealing surface 31 in sealing contact with a surface 31' of a recess 32 formed in the extended portion 9. The lower sealing ring 33 also has a sliding fit on the shaft 12 and in turn an angular sealing surface 34 in sealing engagement with a circular plate 35 fitted loosely about the shaft 12 and generally constituting a closure for the impeller chamber 3. This circular plate and a cylindrical element 36, against which the said plate is positioned, are both supported from the extended portion 9 by a plurality of bolts 37 disposed through the plate and cylindrical element and threaded into the extended portion 9.

Formed on the cylindrical element 36, and spaced intermediate the sealing rings 30 and 33, is an inwardly extending flange 38, against which on opposite sides, are seated a plurality of normally compressed flexible elements 39 which serve to supply the necessary pressure to the sealing rings 30 and 33, to keep the sealing surfaces 31 and 34 of the said sealing rings in sealing engagement with the surface 31' and the circular plate 35, respectively.

Adjacent the upper or outer side of the sealing ring 30, is a small annular gas chamber 42 formed in the intermediate casing 8. Instead of providing an inlet connection in the housing 16 for the introduction of inert gas therein, it is intended that this chamber serve this function. In other words, to initially fill the housing 16 with inert gas and to make up any losses due to leakage, the inert gas is delivered from a source (not shown) through conduit means to be hereinafter described into a tube 63 disposed in the intermediate casing 8 which opens into this said chamber. Although no defined passageways are shown connecting the gas chamber 42 to the interior of the housing 16, it is to be understood that the gas is capable of seeping up along the shaft 12 and entering the housing 16.

In practice, sealing liquid, distinguished in that it is at pump inlet pressure is supplied by conduit means to be hereinafter described, to the sealing chamber 40 through a tube 41 disposed in the intermediate casing 8 and extending through the extended portion 9 into the sealing chamber 40. The limit of pressure then to which the internal sides of both the sealing rings 30 and 33 are subjected is pump inlet pressure.

Meanwhile the outer side of the lower sealing ring 33, or its side adjacent the impeller chamber 3, is subjected to the higher pressure of liquid at pump discharge pressure making its way thereto, through the running clearance left behind the impeller 13. The result of the pressure differential thereby established about the sealing ring 33, is that if there is leakage through or past the said sealing ring, it will be leakage of liquid at the high pressure of pump discharge leaking from the impeller chamber 3 into the sealing chamber 40, and thus in a direction which opposes the flow of lubricant leaking toward the impeller chamber 3.

The outer side of upper sealing ring 30, or its side adjacent the gas chamber 42, is subjected to gas in the gas chamber 42 which is at a pressure controlled by means to be hereinafter described at a value never greater than the pressure of the sealing liquid in the sealing chamber 40. Thus, if there is a chance for leakage through or past this said sealing ring, it will be leakage of sealing liquid from the sealing chamber 40, leaking into the gas chamber 42, or also in a direction which opposes the flow of lubricant leaking toward the impeller chamber 3.

The conduit means through which the sealing liquid is supplied to the sealing chamber 40 comprises a by-pass loop 43, connected to passageways 61 and 62 opening on the pump inlet passage 7, and a tap-off line 47 connected between the by-pass loop and the tube 41 leading to the sealing chamber 40. To initially fill the seal chamber 40 with sealing liquid, a valve 51 in a vent line 52 from the said chamber is opened. Liquid in the pump inlet passage 7, being under a pressure head greater than atmospheric pressure, is thereby induced to flow through passageway 61, through conduit 43 into tap-off line 47, and through tube 41 to fill up the seal chamber 40. The valve 51 is then closed and kept closed during operation of the pump 1. Connected into the by-pass loop to form the preferred embodiment of the invention, but not necessarily essential to the invention is a pressure deducing device 44 such as a standard type fixed orifice element, a small pump 45 which circulates liquid through the by-pass loop, and a filtering device 46 of any standard design which is capable of preventing the passage of lubricant or other contaminants through its filtering means. When the pump 45 is operable, the sealing liquid in the sealing chamber 40 will be at less than pump inlet pressure after being drawn through the pressure reducing device 44 which further increases the pressure differential about the sealing ring 33. The filtering device 46 in turn prevents any lubricant or other contaminants which by chance has obtained entrance into the sealing chamber 40 and has seeped in reverse direction through the tap-off line 47, from further passing through the return line of the by-pass loop into the pump inlet passage 7.

The pressure of the gas supplied to the gas chamber 42 and thus to the housing 16, is controlled by a conventional pressure control device 48 which can be air operated as herein shown or else electrically or hydraulically operated. The pressures of the gas and sealing liquid are transmitted to the said pressure control device through a line 49 connected to the tube 63 in communication with the gas in gas chamber 42, and a line 50 connected to the tap-off line 47. In practice, whenever the gas pressure too closely approaches the sealing liquid pressure, an air signal from a source of air (not shown) is permitted to pass from the pressure control device 48 through a line 53 connected to a normally closed conventional type valve 54 which regulates the flow of gas through the housing outlet line 55. The air signal or pulsation opens the valve 54 and gas is vented to atmosphere through the housing outlet line 55 until the pressure of the gas in the housing 16 reaches a suitably lower value. Conversely, if the gas pressure falls too far below the sealing liquid pressure, an air signal passes through a line 56 connected to a second normally closed conventional type air operated valve 57 to open this valve and permit additional gas from a suitable source (not shown) to flow through a line 58 connected to the housing gas inlet line 49 and thereby increase the gas pressure in the housing 16 to a suitably higher value.

It will be understood that the devices herein described which serve to supply the gas to the gas chamber 42, and which regulate the pressure of the gas relative to the sealing liquid, are merely one of many standard designs readily obtainable on the market and so it is accordingly not intended that the present invention be strictly limited to the use of the devices described.

It will also be understood that the invention, in general, is not intended to be limited to the specific construction or arrangement of parts shown, but that they may be widely modified within the invention defined by the claim.

What is claimed is:

In a sealing device for a pump having a prime mover for driving the pump disposed in a gas-tight enclosure, the combination of a casing having an impeller chamber and a bore opening into the chamber, an impeller rotatable in the impeller chamber, a shaft rotatable in the bore and supporting the impeller, a suitably lubricated bearing in the bore supporting the shaft, a sealing chamber formed in the casing bore between the bearing and the impeller chamber and having one end adjacent the impeller chamber, a gas chamber formed in the casing bore adjacent the other end of the sealing chamber and in communication along the shaft with the gas-tight enclosure of the prime mover, means connected from the pump inlet to the sealing chamber to supply sealing liquid under pump inlet pressure to the sealing chamber, means connected to supply gas at pressure no greater than the pressure of the sealing liquid to the gas chamber, and a first and second sealing means disposed respectively in opposite ends of the sealing chamber and subjected to the pressure of the sealing liquid on their internal sides, the external side of the first sealing means being subjected to the gas pressure and that of the second sealing means to the pressure of liquid at pump discharge pressure, whereby any leakage through or past the first and second sealing means will occur in the direction of the bearing.

References Cited in the file of this patent

UNITED STATES PATENTS

| | | |
|---|---|---|
| 1,736,002 | Frickey et al. | Nov. 19, 1929 |
| 2,075,895 | Harmon | Apr. 6, 1937 |
| 2,423,825 | Blom | July 15, 1947 |
| 2,427,656 | Blom | Sept. 23, 1947 |
| 2,452,261 | Roberts | Oct. 26, 1948 |
| 2,777,395 | Disbrow | Jan. 15, 1957 |

FOREIGN PATENTS

| | | |
|---|---|---|
| 197,944 | Switzerland | Aug. 16, 1938 |